US011608122B2

(12) United States Patent
Enciso

(10) Patent No.: US 11,608,122 B2
(45) Date of Patent: Mar. 21, 2023

(54) DUAL ORTHOGONAL MOUNTING SYSTEM

(71) Applicant: Honda Motor Co., Ltd., Tokyo (JP)

(72) Inventor: Michael M. Enciso, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 16/893,000

(22) Filed: Jun. 4, 2020

(65) Prior Publication Data

US 2021/0380174 A1 Dec. 9, 2021

(51) Int. Cl.
| | | |
|---|---|---|
| B62D 33/027 | (2006.01) | |
| B60J 5/10 | (2006.01) | |
| B60R 9/06 | (2006.01) | |
| B60R 13/02 | (2006.01) | |

(52) U.S. Cl.
CPC .......... *B62D 33/0273* (2013.01); *B60J 5/107* (2013.01); *B60R 9/06* (2013.01); *B60R 13/0206* (2013.01); *E05Y 2900/546* (2013.01)

(58) Field of Classification Search
CPC ....... B62D 33/0273; B60J 5/107; B60J 5/108; B60J 5/0468; B60J 5/0413; B60J 5/0416; B60R 9/06; B60R 13/0206; F16B 7/044
See application file for complete search history.

(56) References Cited

U.S. PATENT DOCUMENTS

| | | | | |
|---|---|---|---|---|
| 4,900,184 A | * | 2/1990 | Cleveland ............... | E04C 5/168 24/339 |
| 8,757,562 B2 | | 1/2014 | Fujiwara | |
| 2006/0220409 A1 | * | 10/2006 | Smith ................ | B62D 33/0273 296/57.1 |
| 2013/0249230 A1 | * | 9/2013 | Gillay ................. | B60R 13/0206 296/1.08 |
| 2013/0305653 A1 | * | 11/2013 | Ishizu ....................... | F16B 2/20 52/718.01 |
| 2014/0319808 A1 | | 10/2014 | Vamamoto | |
| 2015/0291010 A1 | * | 10/2015 | Gillay ................. | E05B 17/0062 296/146.7 |
| 2019/0092251 A1 | * | 3/2019 | Okamoto ............ | B60R 13/0206 |
| 2019/0186523 A1 | | 6/2019 | Heinrichs et al. | |
| 2020/0062167 A1 | * | 2/2020 | Campbell ............. | B60P 7/0807 |
| 2021/0284251 A1 | * | 9/2021 | Dearing ............... | B62D 33/037 |

(Continued)

FOREIGN PATENT DOCUMENTS

| | | |
|---|---|---|
| JP | 2775240 B2 | 7/1998 |
| JP | 3620692 B2 | 2/2005 |
| JP | 5225244 B2 | 4/2011 |

(Continued)

OTHER PUBLICATIONS

Espacenet Machine Translation of KR Patent No. 101400525 B1.

(Continued)

*Primary Examiner* — Gregory A Blankenship
(74) *Attorney, Agent, or Firm* — Plumsea Law Group, LLC

(57) ABSTRACT

A mounting system for clips on a vehicle body panel includes a first portion having a first mounting surface and a first through-opening in the first mounting surface being configured to receive a first clip; and a second portion having a second mounting surface and a second through-opening in the second mounting surface being configured to receive a second clip. The first mounting surface is orthogonal to the second mounting surface.

20 Claims, 5 Drawing Sheets

(56) References Cited

U.S. PATENT DOCUMENTS

2021/0354535 A1* 11/2021 Harada ............... B60J 5/0468
2021/0380174 A1* 12/2021 Enciso Maciel .... B60R 16/0215

FOREIGN PATENT DOCUMENTS

| KR | 200180660 Y1 | 6/2000 |
|---|---|---|
| KR | 20080043490 A | 5/2008 |
| KR | 101400525 B1 | 5/2014 |
| KR | 101824401 B1 | 2/2018 |
| WO | 2018138407 A1 | 8/2018 |

OTHER PUBLICATIONS

Espacenet Machine Translation of KR Patent No. 101824401 B1.
Espacenet Machine Translation of Published KR Application No. 20080043490 A.
Espacenet Machine Translation of JP Patent No. 5225244 B2.
Foto4easy Heavy Duty Metal Dual Double U Clip Clamp for Photo Studio Boom Arm Light Stand. Amazon [online]. foto4easy, 2015 [retrieved on Jun. 10, 2020]. Retrieved from the Internet: <URL: https://www.amazon.com/Foto4easy-Heavy-Metal-Double-Studio/dp/B0126UKFL0>.
Shhworldsea 100PCS Routing Clips for Wire Loom for GM 124040984 Auto PLASTIC Clips and Fastners Automotive Clips and Fasteners. Aliexpress [online], shhworldsea [retrieved on Jun. 10, 2020], Retrieved from the Internet: <URL https://www.aliexpress.com/item/1136581447.html>.

\* cited by examiner

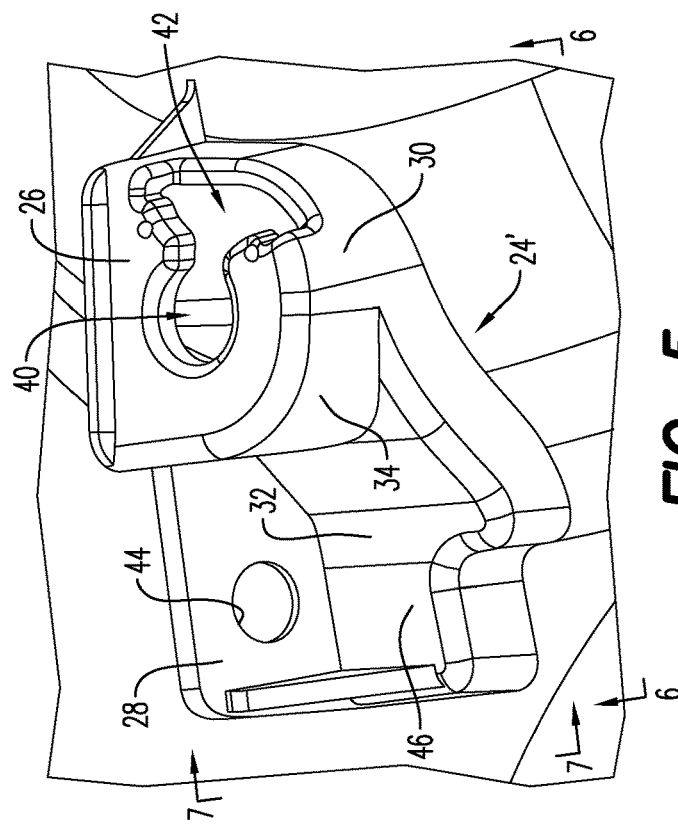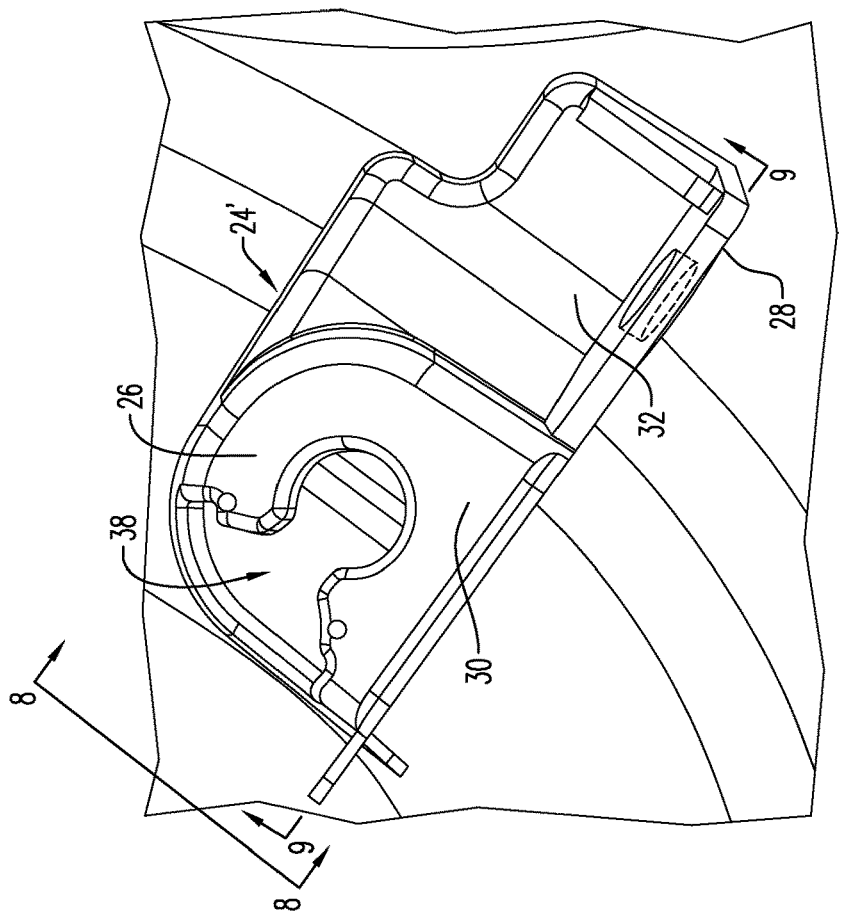

DUAL ORTHOGONAL MOUNTING SYSTEM

BACKGROUND OF THE INVENTION

1. Field of the Invention

The present invention relates to a mounting system for clips in a vehicle and, more particularly, to a dual orthogonal mounting system for body clips and/or wire harness clip.

2. Description of Related Art

Vehicle tailgates, which are common on many sport utility vehicles, minivans, and hatch back automobiles, generally include an interior panel providing a finished, color matched surface visible from the interior of the vehicle. The rear or backside of the interior panel, however, may include, for example, wiring, interior lights, attachment clips, and the like. Convention wiring clips and associated mounting structures are used to secure the wiring harness for the lights to the backside of the interior panel, and conventional body clips and associated mounting structures are provided which allow an exterior panel to be attached to the interior panel.

Generally, the interior panels are formed by injection molding from plastic and the mounting structures for the various clips are molded simultaneously with the interior panel. The mounting structures are created through the use of mechanical or hydraulic lifter slides for injection molding and usually require one slide per clip. The lifter slides, however, are expensive and they require considerable space to be used on the backside of the interior panel, or other component. The space requirement is further complicated when both wiring clips and body clips must both be disposed at a particular location, such as along the curvature of a raised rib on the interior panel, because then there are clearance concerns for the two slides for the two clips to be properly positioned in close proximity to one another.

There is thus a need in the art for a system and method that addresses the shortcomings of the prior art discussed above.

SUMMARY OF THE INVENTION

The disclosure herein provides a mounting system that can accommodate both a body clip and a wire clip in a single mounting structure, thus overcoming the space concerns associated with two adjacent conventional mounting structures while still keeping tooling investment low.

In one aspect, the invention provides a mounting system for clips on a vehicle body panel, the mounting system including a first portion having a first mounting surface, a first through-opening in the first mounting surface being configured to receive a first clip; and a second portion having a second mounting surface, a second through-opening in the second mounting surface being configured to receive a second clip. The first mounting surface is disposed orthogonal to the second mounting surface.

In a still further aspect, the invention provides a mounting system for clips on a vehicle, the mounting system including a first clip for retaining a body panel; a second clip for retaining electrical wiring; and a mounting structure having a first portion and a second portion, the first portion having a first mounting surface with a first through-opening in the first mounting surface configured to receive the first clip, and the second portion having a second mounting surface with a second through-opening in the second mounting surface configured to receive the second clip. The first mounting surface is orthogonal to the second mounting surface, and the first clip is different from the second clip.

In another aspect, a mounting system for retaining clips includes a first portion defining a first mounting surface and a first opening being formed in the first mounting surface; and a second portion defining a second mounting surface and a second opening being formed in the second mounting surface. The first mounting surface is orthogonal to the second mounting surface, and the first portion and the second portion are integrally formed.

Other systems, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 4 is a top view of the dual orthogonal mounting system shown in FIG. 3 with the clips removed.

FIG. 5 is a rear perspective view of the dual orthogonal mounting system shown in FIG. 4.

DETAILED DESCRIPTION

Figure 1:
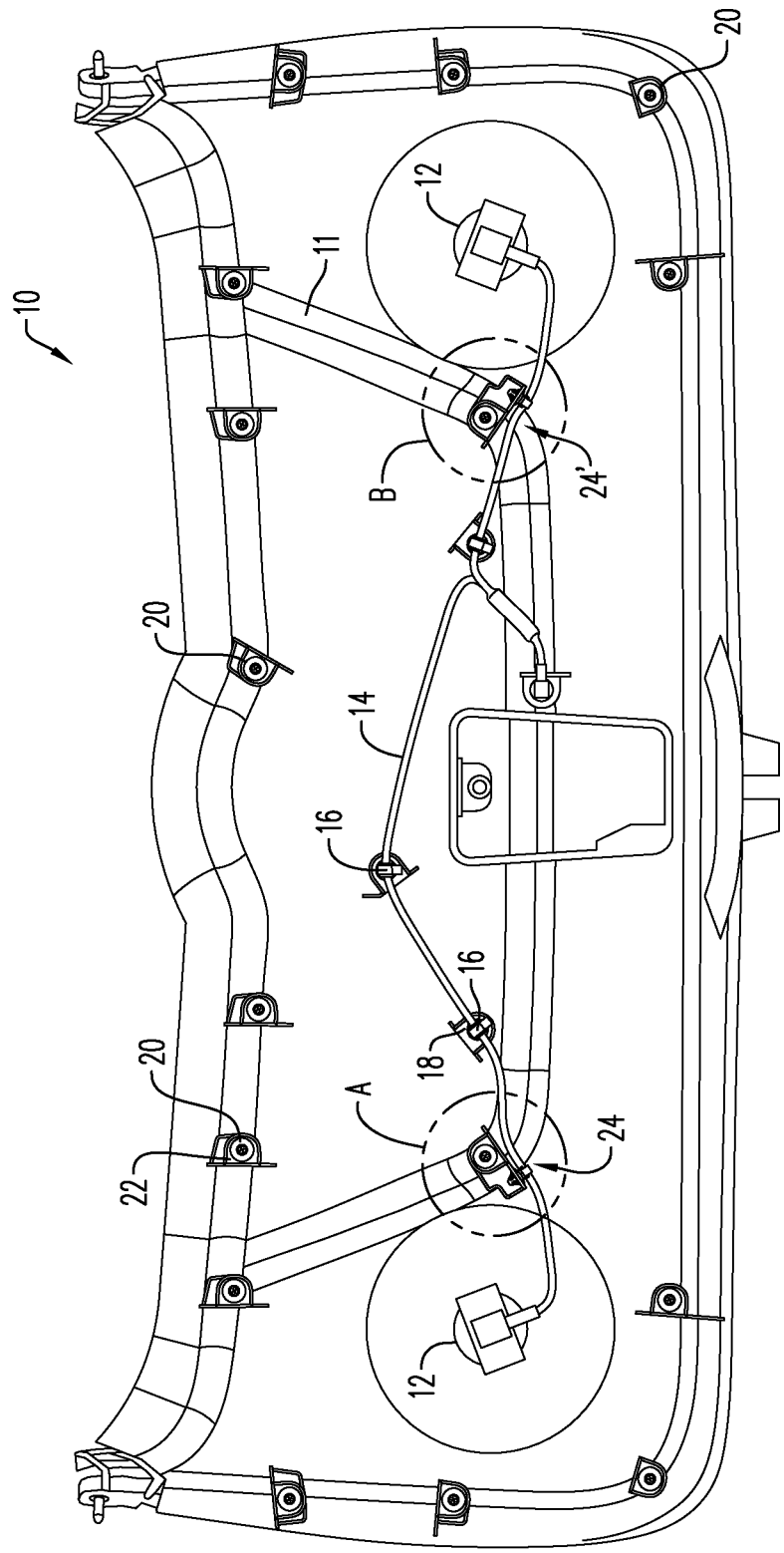
FIG. 1 is a rear or backside view of an interior vehicle panel showing an exemplary embodiment of the dual orthogonal mounting system according to the disclosure herein.

An interior or inner body panel of a vehicle, such as a vehicle tailgate, is shown generally in FIG. 1 by reference number 10. As known in the art, the back side or rear of the inner panel includes lights 12, an electrical wiring harness 14 for connecting the lights 12 to a power source, and a plurality of wiring clips 16 secured in conventional mounting structures 18 for holding the wiring harness 14 in position. The inner panel also generally includes a plurality of body clips 20 secured in conventional mounting structures 22 for use in attaching an exterior panel (not shown). The wiring clips 16 and body clips 20 referred to herein are conventional clips known in the art and a detailed description thereof is therefor omitted.

Figure 3:
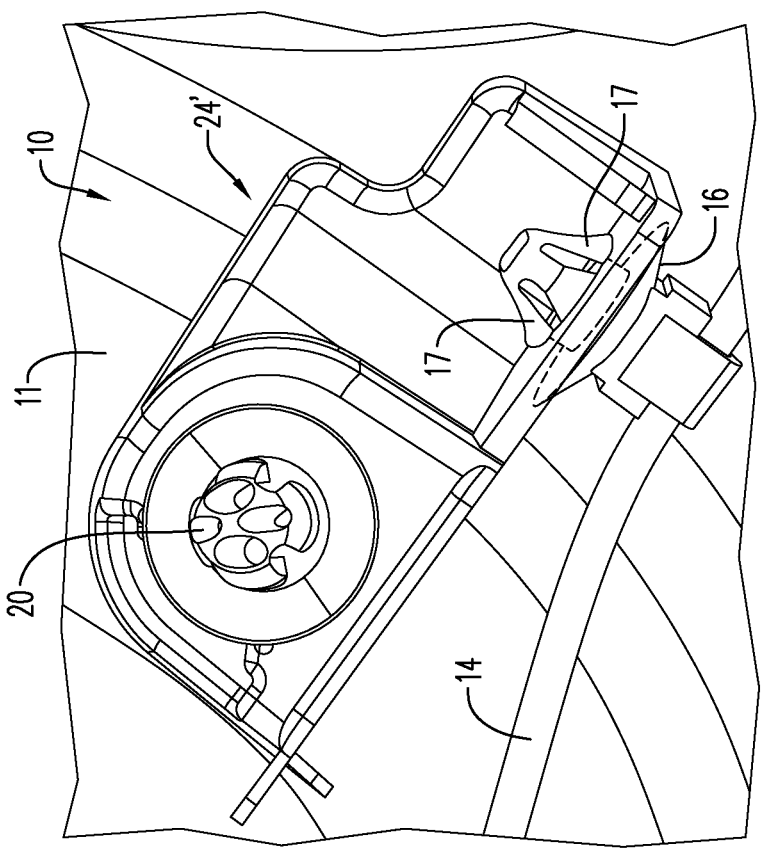
FIG. 3 is an enlarged view of the dual orthogonal mounting system shown in Detail B in FIG. 1.
Figure 2:
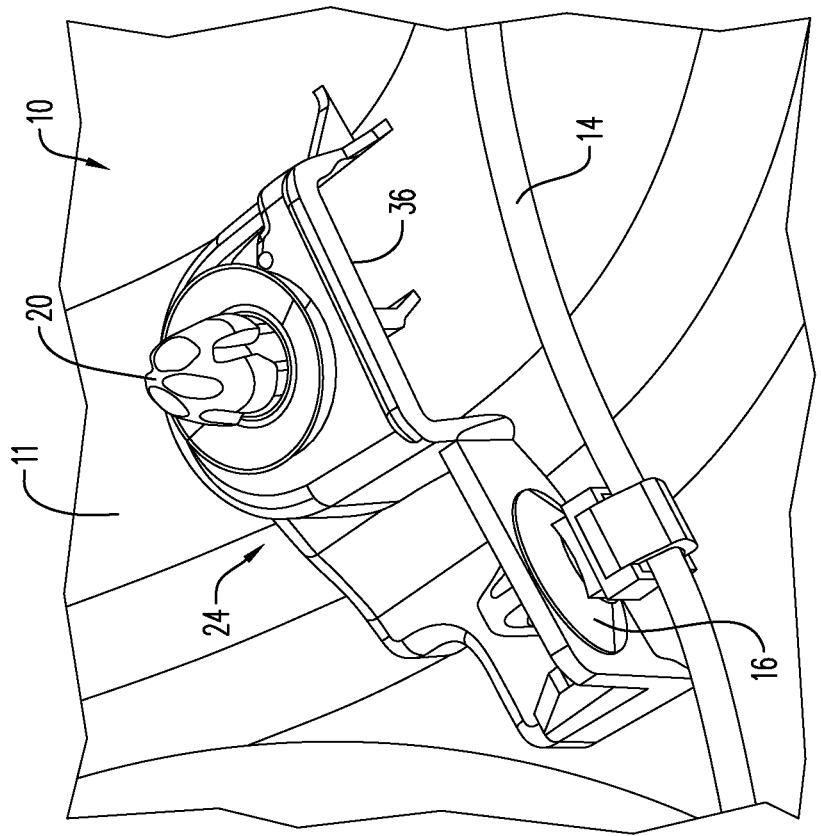
FIG. 2 is an enlarged perspective view of the dual orthogonal mounting system shown in Detail A in FIG. 1.
Figure 7:
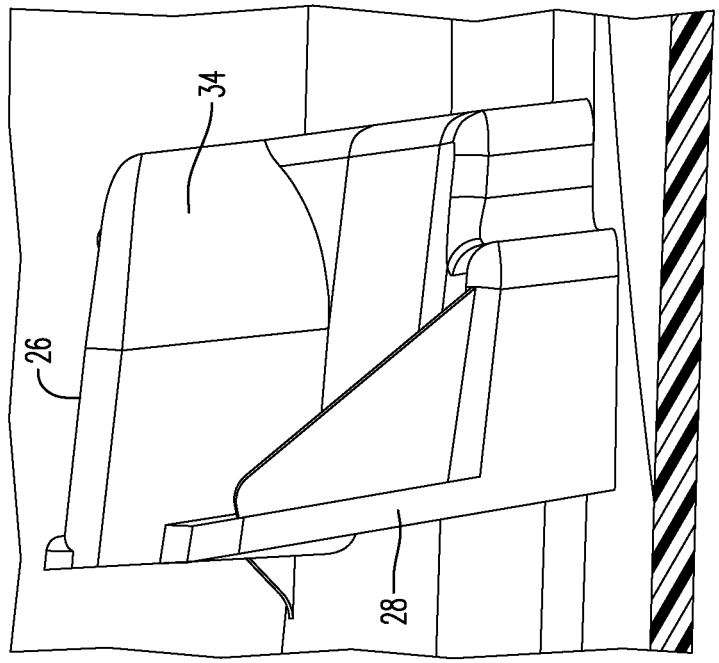
FIG. 7 is a cross section taken generally along line 7-7 in FIG. 5.
Figure 6:
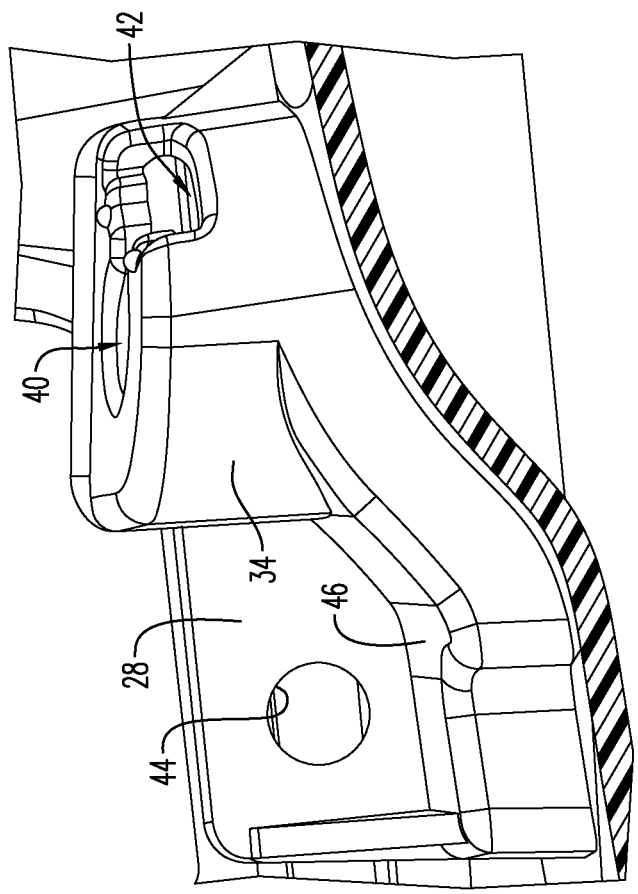
FIG. 6 is a cross section taken generally along line 6-6 in FIG. 5.
Figure 8:
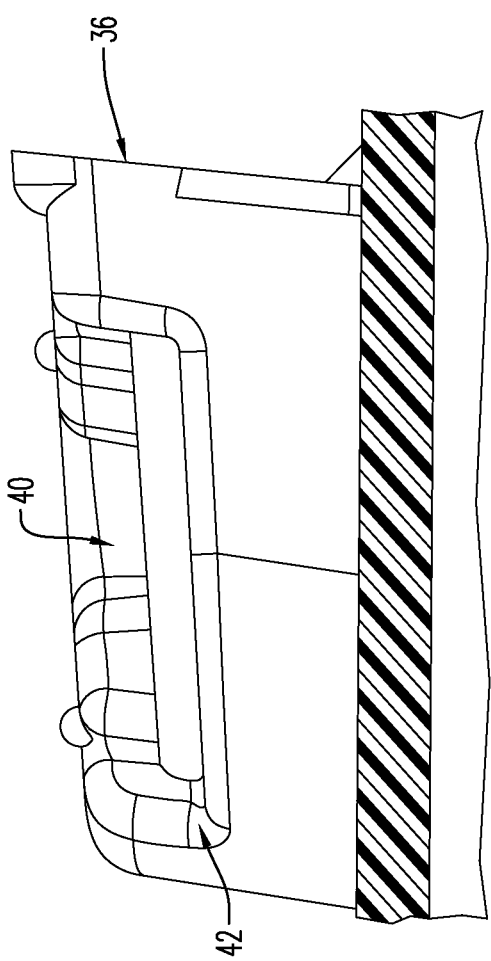
FIG. 8 is a cross section taken generally along line 8-8 in FIG. 4.
Figure 9:
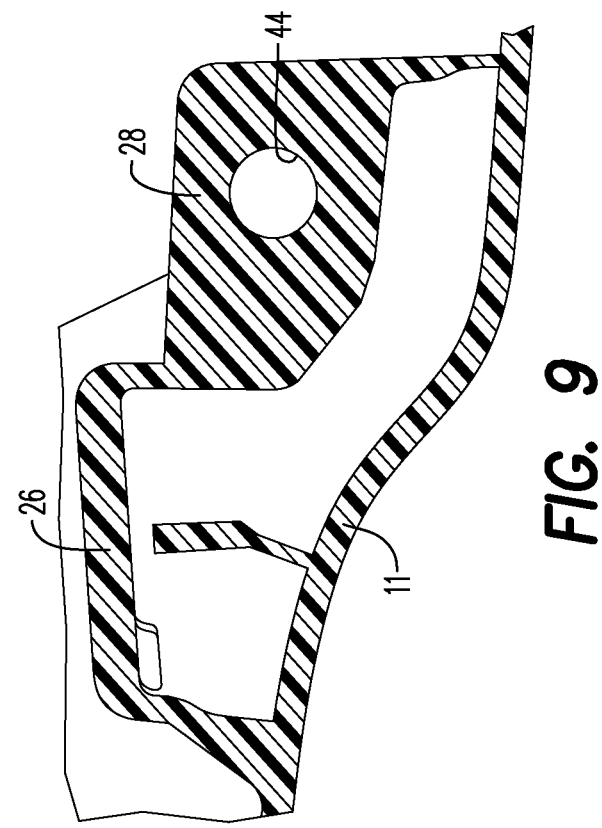
FIG. 9 is a cross section taken generally along line 9-9 in FIG. 4.

Referring also to FIGS. 2 and 3, in accordance with an exemplary embodiment of the disclosure, the inner panel further includes a mounting system 24, 24' located on the rear side of the inner body panel 10. The mounting system 24, 24' provides adjacent mounting locations for both a wiring clip 16 and a body clip 20 in a unitary structure. As will be appreciated by one skilled in the art, mounting systems 24, 24' are merely mirror images of one another disposed on opposing sides of a raised rib 11 on the panel 10. As shown, the mounting surfaces 26, 28 for the clips 20, 16, respectively, are disposed orthogonal to each other in order to conserve space along the curvature of rib 11. More particularly, the mounting system 24, 24' includes a first portion 30 configured to receive the body clip 20 and a second portion 32 configured to receive the wiring clip 16, thus requiring that only one lifter slide be utilized and positioned within the limited space along the curve of the rib 11 in order to fabricate the mounting system 24, 24' as a unitary injection molded structure. Hence, by using a single unitary mounting structure 24, 24', the space concerns associated with two adjacent conventional mounting structures are alleviated and the manufacturing costs are reduced since only one lifter slide is required to produce the same.

The first portion 30 of the mounting system 24, 24' is semi-circular in shape and roughly resembles an igloo or doghouse in that it has a rounded rear surface 34 extending from a front entrance opening 36. As best shown in FIGS. 4 and 5, the top mounting surface 26 and rounded rear surface 34 define a cut out region 38 including a generally circular opening 40 on substantially planar mounting surface 26 which flares outwardly as it increases in size to form a rear surface opening 42. The cut out region 38 is provided in order to allow the body clip 20 to slide into the first portion 30 through the rear surface opening 42 from the side of the rounded rear surface 34 and then be secured within the circular opening 40.

The second portion 32 of the mounting system 24, 24' includes mounting surface 28 generally axially aligned or flush with a plane of the front entrance opening 36 of the first portion, that is, the forward edge of the first portion 30. Mounting surface 28 is substantially planar and includes a circular opening 44 configured to receive the wiring clip 16. As best shown in FIG. 3, wiring clip 16 includes resilient legs 17 which can be compressed together to enable the forward end of the wiring clip 16 to be inserted through the circular opening 44 from a first side of mounting surface 28. Upon release of the force, the resilient legs 17 expand outward against a second, opposing side of mounting surface 28 and thereby secure the wiring clip 16 within the opening 44. The second portion 32 further includes a bottom 46 extending from a lower edge of the mounting surface 28 which aids in maintaining the structural integrity of the mounting system 24, 24'. As mentioned above, the second portion 32 and the first portion 30 of mounting system 24, 24' are integrally formed during the injection molding process of the inner panel 10.

The above description of mounting system 24, 24' as utilized on the inner panel of a vehicle tailgate is exemplary in nature as one skilled in the art will appreciate that mounting system 24, 24' could be utilized on a plurality of different panels for a vehicle and the exemplary use thereof on a tailgate panel is not limiting on the invention. Further, while the mounting system 24, 24' is described in detail as providing mounting surfaces for body clips and wiring clips for the wiring harness, one skilled in the art will recognize that the mounting system 24, 24' could be adapted to receive alternative clip structures as necessitated by vehicle design.

Hence, while various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A mounting system for clips on a vehicle body panel, the mounting system comprising:
    a first portion having a first mounting surface, a first through-opening in the first mounting surface being configured to receive a first clip; and
    a second portion having a second mounting surface, a second through-opening in the second mounting surface being configured to receive a second clip;
    wherein the first portion is generally semi-circular in shape; and
    wherein said first mounting surface is orthogonal to said second mounting surface.

2. The mounting system according to claim 1, wherein the first portion and the second portion are integrally formed.

3. The mounting system according to claim 1, wherein the first mounting surface and the second mounting surface define substantially planar surfaces.

4. The mounting system according to claim 1, wherein the first portion defines an igloo shape having a front entrance opening into the igloo shape and a rearward curved surface.

5. The mounting system according to claim 4, wherein second mounting surface is axially aligned with a plane of the front entrance opening of the first portion.

6. The mounting system according to claim 4, wherein said rearward curved surface includes an open region connecting with said first through-opening in the first mounting surface.

7. The mounting system according to claim 1, wherein the second portion includes said second mounting surface and a bottom portion extending therefrom.

8. The mounting system according to claim 7, wherein the second through-opening in the second mounting surface defines a circular opening.

9. A mounting system for clips on a vehicle, the mounting system comprising:
    a first clip for retaining a body panel;
    a second clip for retaining electrical wiring;
    a mounting structure having a first portion and a second portion, the first portion having a first mounting surface with a first through-opening in the first mounting surface configured to receive the first clip, and the second portion having a second mounting surface with a second through-opening in the second mounting surface configured to receive the second clip;
    wherein the second through-opening in the second mounting surface defines a circular opening;
    wherein said first mounting surface is orthogonal to said second mounting surface; and
    wherein said first clip is different from said second clip.

10. The mounting system according to claim 9, wherein the first portion and the second portion are integrally formed.

11. The mounting system according to claim 9, wherein the first mounting surface and the second mounting surface define substantially planar surfaces.

12. The mounting system according to claim 9, wherein the first portion is generally semi-circular in shape.

13. The mounting system according to claim 12, wherein the first portion defines an igloo shape having a front entrance opening into the igloo shape and a rearward curved surface, the first mounting surface defining an upper surface of the igloo shape.

14. The mounting system according to claim 13, wherein said rearward curved surface includes an open region connecting with said first through-opening in the first mounting surface.

15. The mounting system according to claim 9, wherein the second portion includes said second mounting surface and a bottom portion extending therefrom.

16. A mounting system for retaining clips, the mounting system comprising:
   a first portion defining a first mounting surface and a first opening being formed in the first mounting surface, the first opening defining a first axis; and
   a second portion defining a second mounting surface and a second opening being formed in the second mounting surface, the second opening defining a second axis;
   wherein said first mounting surface is orthogonal to said second mounting surface;
   wherein said first axis is orthogonal to said second axis;
   wherein the first portion further includes a rear surface extending from the first mounting surface, the first opening extending from the first mounting surface to the rear surface; and
   wherein the first portion and the second portion are integrally formed.

17. The mounting system according to claim 16, wherein the first mounting surface and the second mounting surface define substantially planar surfaces.

18. The mounting system according to claim 16, wherein said second mounting surface is substantially flush with a forward edge of the first portion.

19. The mounting system according to claim 16, wherein the first portion is generally semi-circular in shape.

20. The mounting system according to claim 16, further comprising the first opening receiving a first retaining clip and the second opening receiving a second retaining clip.

\* \* \* \* \*